United States Patent
Lilburn et al.

(10) Patent No.: US 10,114,116 B2
(45) Date of Patent: Oct. 30, 2018

(54) COMMON BURST FOR PULSE COMPRESSION RADAR

(71) Applicant: Navico Holding AS, Egersund (NO)

(72) Inventors: Lindsay Lilburn, Auckland (NZ); Roger Phillips, Auckland (NZ); Ee Chen, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 481 days.

(21) Appl. No.: 14/829,582

(22) Filed: Aug. 18, 2015

(65) Prior Publication Data
US 2016/0054437 A1     Feb. 25, 2016

Related U.S. Application Data

(60) Provisional application No. 62/039,310, filed on Aug. 19, 2014.

(51) Int. Cl.
*G01S 7/282*     (2006.01)
*G01S 13/42*     (2006.01)
(Continued)

(52) U.S. Cl.
CPC ............ *G01S 13/282* (2013.01); *G01S 7/282* (2013.01); *G01S 13/0209* (2013.01); *G01S 13/42* (2013.01); *G01S 13/9307* (2013.01)

(58) Field of Classification Search
CPC .... G01S 13/282; G01S 7/282; G01S 13/0209; G01S 13/42; G01S 13/9307; G01S 13/24;
(Continued)

(56) References Cited

U.S. PATENT DOCUMENTS 3,825,899 A * 7/1974 Haeberle ............. H04B 7/2125
                                                      370/324
4,021,805 A   5/1977 Effinger et al.
(Continued)

FOREIGN PATENT DOCUMENTS

CN     101464513 A      6/2009
EP      0849606 A1 *   6/1998 ............. G01S 13/24
(Continued)

OTHER PUBLICATIONS

Simrad "Broadband 4G™ Radar." Simrad Marine Electronics, https://ww2.simrad-yachting.com/en-CA/Products/Radar/Broadband-4G-Radar-en-ca.aspx. retrieved Jan. 26, 2018.
(Continued)

*Primary Examiner* — Timothy A Brainard
*Assistant Examiner* — Nuzhat Pervin
(74) *Attorney, Agent, or Firm* — Nelson Mullins Riley & Scarborough LLP

(57) ABSTRACT

Various implementations described herein are directed to a common burst for pulse compression radar. In one implementation, a method may include determining a first burst for a first range using a pulse compression radar system, where the first burst comprises one or more first transmission frames. The method may also include determining a second burst for a second range using the pulse compression radar system, where the second burst comprises one or more second transmission frames. The method may further include transmitting a common burst for the first range and the second range using the pulse compression radar system, where the common burst includes the one or more first transmission frames and the one or more second transmission frames.

20 Claims, 7 Drawing Sheets

(51) Int. Cl.
*G01S 13/28* (2006.01)
*G01S 13/02* (2006.01)
*G01S 13/93* (2006.01)

(58) Field of Classification Search
CPC . G01S 13/53; G01S 7/288; G01S 7/28; G01S 7/38; G01S 13/003; G01S 13/9035; G01S 7/021; G01S 7/2923; G01S 13/284; G01S 7/2806; H04B 7/2125
USPC ........................................................ 342/132
See application file for complete search history.

(56) References Cited

U.S. PATENT DOCUMENTS

| | | | | |
|---|---|---|---|---|
| 4,028,700 | A | 6/1977 | Carey et al. | |
| 4,047,173 | A | 9/1977 | Miller | |
| 4,114,154 | A | 9/1978 | Sarfati | |
| 4,136,341 | A | 1/1979 | Mulder et al. | |
| 4,211,485 | A | 7/1980 | Koreicho | |
| 4,216,474 | A | 8/1980 | Levine | |
| 4,243,988 | A | 1/1981 | Kang et al. | |
| 4,328,495 | A | 5/1982 | Thue | |
| 4,353,067 | A * | 10/1982 | Mims | G01S 13/284 342/189 |
| 4,566,010 | A | 1/1986 | Collins | |
| 4,626,853 | A | 12/1986 | Lee et al. | |
| 4,686,534 | A | 8/1987 | Eddy | |
| 4,772,889 | A | 9/1988 | Elleaume | |
| 4,800,388 | A | 1/1989 | Okada | |
| 4,851,848 | A * | 7/1989 | Wehner | G01S 13/24 342/179 |
| 4,929,954 | A | 5/1990 | Elleaume | |
| 4,983,979 | A | 1/1991 | McKenzie | |
| 4,989,010 | A | 1/1991 | Crevoulin et al. | |
| 5,003,313 | A | 3/1991 | Doriath | |
| 5,128,681 | A | 7/1992 | McGroary et al. | |
| 5,141,308 | A | 8/1992 | Danckwerth et al. | |
| 5,151,702 | A | 9/1992 | Urkowitz | |
| 5,173,706 | A | 12/1992 | Urkowitz | |
| 5,227,801 | A * | 7/1993 | Pierce | G01S 13/9035 342/192 |
| 5,309,161 | A | 5/1994 | Urkowitz et al. | |
| 5,389,933 | A | 2/1995 | Golinsky | |
| 5,414,428 | A | 5/1995 | Gallagher et al. | |
| 5,481,270 | A | 1/1996 | Urkowitz et al. | |
| 5,530,448 | A | 6/1996 | Lewis | |
| 5,943,004 | A * | 8/1999 | Groenenboom | G01S 13/24 342/128 |
| 5,977,905 | A * | 11/1999 | Le Chevalier | G01S 13/53 342/110 |
| 6,067,043 | A | 5/2000 | Faure et al. | |
| 6,377,204 | B1 | 4/2002 | Wurman et al. | |
| 7,019,686 | B2 | 3/2006 | Hester et al. | |
| 7,081,846 | B1 * | 7/2006 | Sparrow | G01S 7/38 342/14 |
| 7,106,250 | B2 | 9/2006 | Blunt et al. | |
| 7,675,458 | B2 | 3/2010 | Hubbard et al. | |
| 7,688,257 | B1 | 3/2010 | Christianson et al. | |
| 7,764,223 | B2 * | 7/2010 | Wade | G01S 7/28 342/107 |
| 8,022,863 | B1 | 9/2011 | Nuthalapati | |
| 8,232,907 | B2 | 7/2012 | Aarseth et al. | |
| 9,194,946 | B1 | 11/2015 | Vacanti | |
| 2004/0027274 | A1 * | 2/2004 | Driessen | G01S 7/2923 342/91 |
| 2005/0179585 | A1 * | 8/2005 | Walker | G01S 13/0209 342/134 |
| 2008/0018526 | A1 * | 1/2008 | Wade | G01S 7/28 342/204 |
| 2008/0111734 | A1 | 5/2008 | Fam et al. | |
| 2008/0316086 | A1 * | 12/2008 | Hoctor | G01S 7/288 342/137 |
| 2009/0079620 | A1 | 3/2009 | Van Caekenberghe et al. | |
| 2009/0121920 | A1 | 5/2009 | Mullarkey et al. | |
| 2011/0279307 | A1 | 11/2011 | Song | |
| 2012/0262332 | A1 | 10/2012 | Ohnishi | |
| 2012/0293361 | A1 | 11/2012 | Mowbray et al. | |
| 2013/0099959 | A1 | 4/2013 | Matsuo | |
| 2013/0135140 | A1 | 5/2013 | Kishigami et al. | |
| 2014/0341137 | A1 * | 11/2014 | Crowle | G01S 7/021 370/329 |
| 2016/0054432 | A1 * | 2/2016 | Lilburn | G01S 7/2806 342/195 |
| 2016/0259041 | A1 * | 9/2016 | Tan | G01S 13/003 |

FOREIGN PATENT DOCUMENTS

| | | | |
|---|---|---|---|
| EP | 2805425 B1 * | 7/2015 | ............ G01S 7/021 |
| JP | 2982769 B2 | 11/1999 | |
| JP | 2009-128278 A | 6/2009 | |

OTHER PUBLICATIONS

Furuno "24 Radome Radar Sensor DRS4D" Marine Radar Products, http://www.furuno.com/en/products/radar/DRS4D . Retrieved Jan. 26, 2018.

* cited by examiner

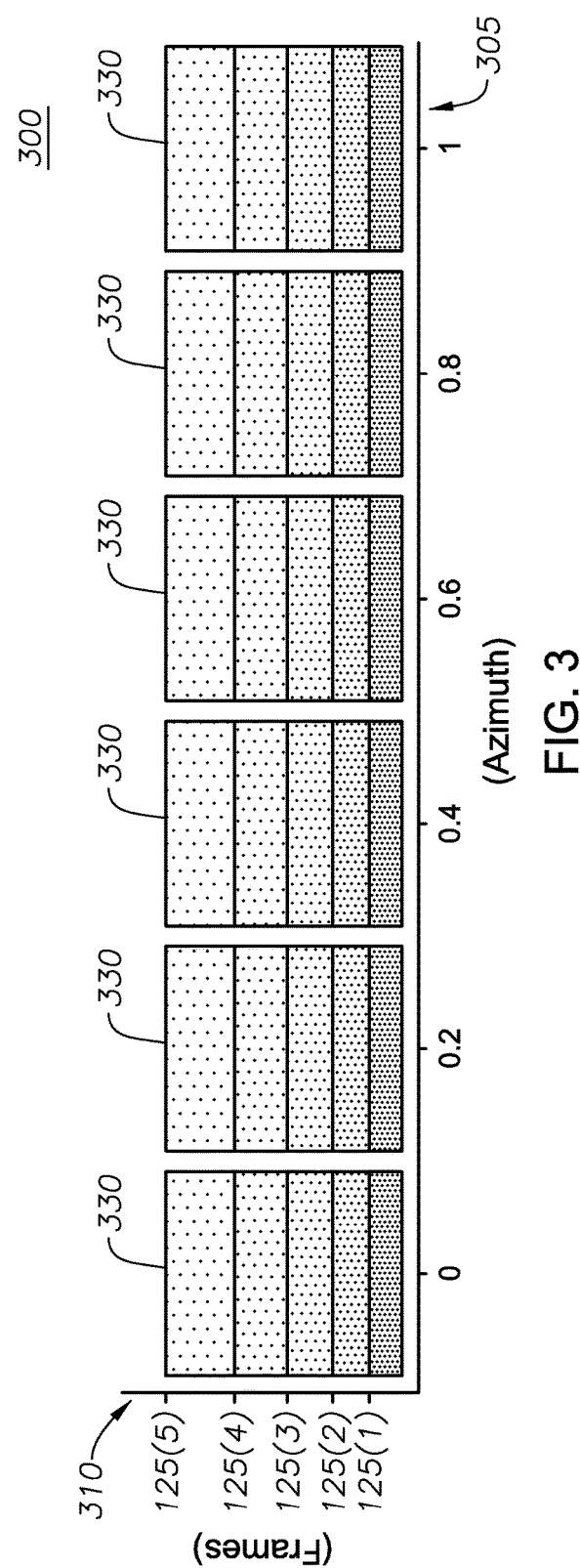

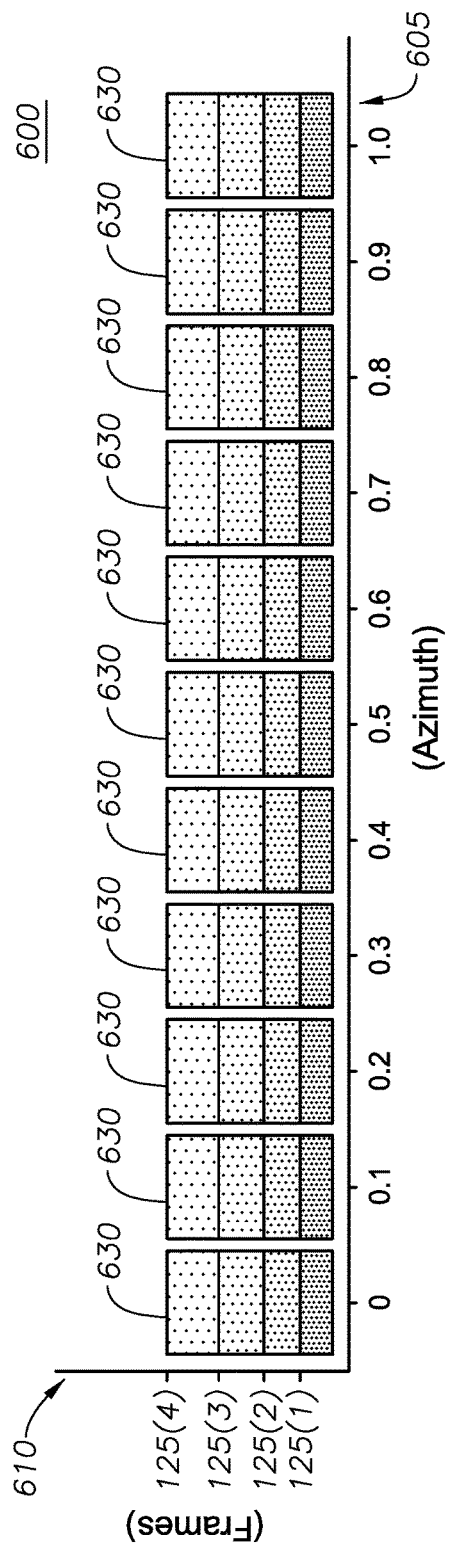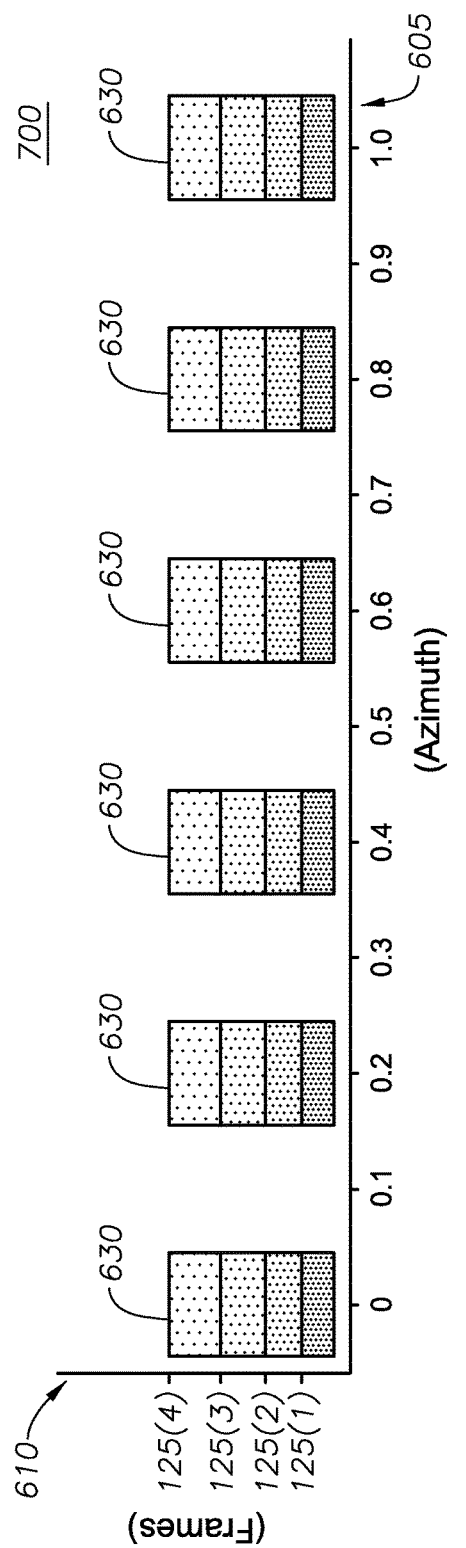

COMMON BURST FOR PULSE COMPRESSION RADAR

CROSS-REFERENCE TO RELATED APPLICATIONS

This application claims the benefit of U.S. Provisional Patent Application Ser. No. 62/039,310, filed Aug. 19, 2014, titled MULTI-RANGE FOR PULSE COMPRESSION RADAR, and the disclosure of which is incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A radar system may be used in a number of scenarios. For example, a radar system may be used by an operator on board a vessel to safely navigate through a marine environment. In particular, the radar system may be used to track neighboring vessels and obstacles for the purposes of collision avoidance, weather detection, situational awareness, and/or the like.

Further, with a single range radar system, the system may be able to track neighboring vessels and obstacles that are located within a specified range of the vessel, where only one range may be specified at a time. To track neighboring vessels and obstacles that are located within a different range, the operator has to change radar control settings to re-optimize the single range radar system for the different range. Particular functions (e.g., collision avoidance, weather detection, etc.) for the radar system may each be performed optimally at a different range, thereby causing the operator to frequently change the radar control settings if performing more than one of these functions at a time. This frequent changing of the radar control settings can be distracting to the operator when operating the vessel.

SUMMARY

Described herein are implementations of various technologies relating to a common burst for pulse compression radar. In one implementation, a method may include determining a first burst for a first range using a pulse compression radar system, where the first burst comprises one or more first transmission frames. The method may also include determining a second burst for a second range using the pulse compression radar system, where the second burst comprises one or more second transmission frames. The method may further include transmitting a common burst for the first range and the second range using the pulse compression radar system, where the common burst includes the one or more first transmission frames and the one or more second transmission frames.

In another implementation, a pulse compression radar system may include a digital signal processor configured to determine a first burst for a first range, where the first burst comprises one or more first transmission frames. The digital signal processor may also be configured to determine a second burst for a second range, where the second burst comprises one or more second transmission frames. The pulse compression radar system may also include an antenna configured to transmit a common burst for the first range and the second range, where the common burst includes the one or more first transmission frames and the one or more second transmission frames.

In yet another implementation, a method may include determining a first burst for a first range using a pulse compression radar system, where the first burst comprises one or more first transmission frames. The method may also include determining a second burst for a second range using the pulse compression radar system, where the second burst comprises one or more second transmission frames. The method may further include determining a third burst for a third range using the pulse compression radar system, where the third burst comprises one or more third transmission frames. The method may additionally include transmitting a common burst for the first range, the second range, and the third range using the pulse compression radar system. The common burst may include the one or more first transmission frames, the one or more second transmission frames, and the one or more third transmission frames. At least one common transmission frame may be included in the one or more first transmission frames, the one or more second transmission frames, and the one or more third transmission frames. Further, the at least one common transmission frame may be transmitted once with the common burst.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIG. 2 illustrates a pictorial representation of bursts in accordance with the techniques described herein.

FIG. 3 illustrates a pictorial representation of a common burst that is radio transmitted by a multi-range pulse compression radar system in accordance with the techniques described herein.

FIG. 6 illustrates a pictorial representation of a common burst that is radio transmitted by a multi-range pulse compression radar system in accordance with the techniques described herein.

FIG. 7 illustrates a pictorial representation of a common burst that is radio transmitted by a multi-range pulse compression radar system in accordance with the techniques described herein.

DETAILED DESCRIPTION

Various implementations directed to a common burst for pulse compression radar will now be described in the following paragraphs with reference to FIGS. 1-9.

As noted above, a radar system may be used in a number of purposes. For example, a radar system may be used by an operator on board a vessel to safely navigate through a marine environment. In particular, the radar system may be used to track neighboring vessels and obstacles for the purposes of collision avoidance, weather detection, situational awareness, and/or the like.

A pulse compression radar system capable of transmitting signals for multiple ranges may be used. Such a system may hereinafter be referred to as a multi-range pulse compression radar system. The multi-range pulse compression radar system may determine the distance of one or more objects by transmitting one or more radar signals to an area proximate to the system, receiving a reflected signal, and determining a time delay between the received signal and the transmitted signal. In particular, the multi-range pulse compression radar system may initially transmit a radar signal. If there is an object in the direction of the transmitted signal, then the transmitted signal may reflect or echo off of the object. After the transmitted signal is reflected, the multi-range pulse compression radar system may then receive the reflected signal.

The multi-range pulse compression radar system may determine the distance of the object by determining a time delay between the reflected signal and the transmitted signal. The signals that are transmitted and reflected are known to travel at the speed of light, c. If the time delay between the reflected signal and the transmitted signal is designated as t, then the distance that the signal has traveled is equal to the product of c and t. Since the signal makes a round-trip, the position of the detected object relative to the multi-range pulse compression radar system may be equal to half of the distance that the signal has traveled, or ct/2.

Bursts

Figure 1:
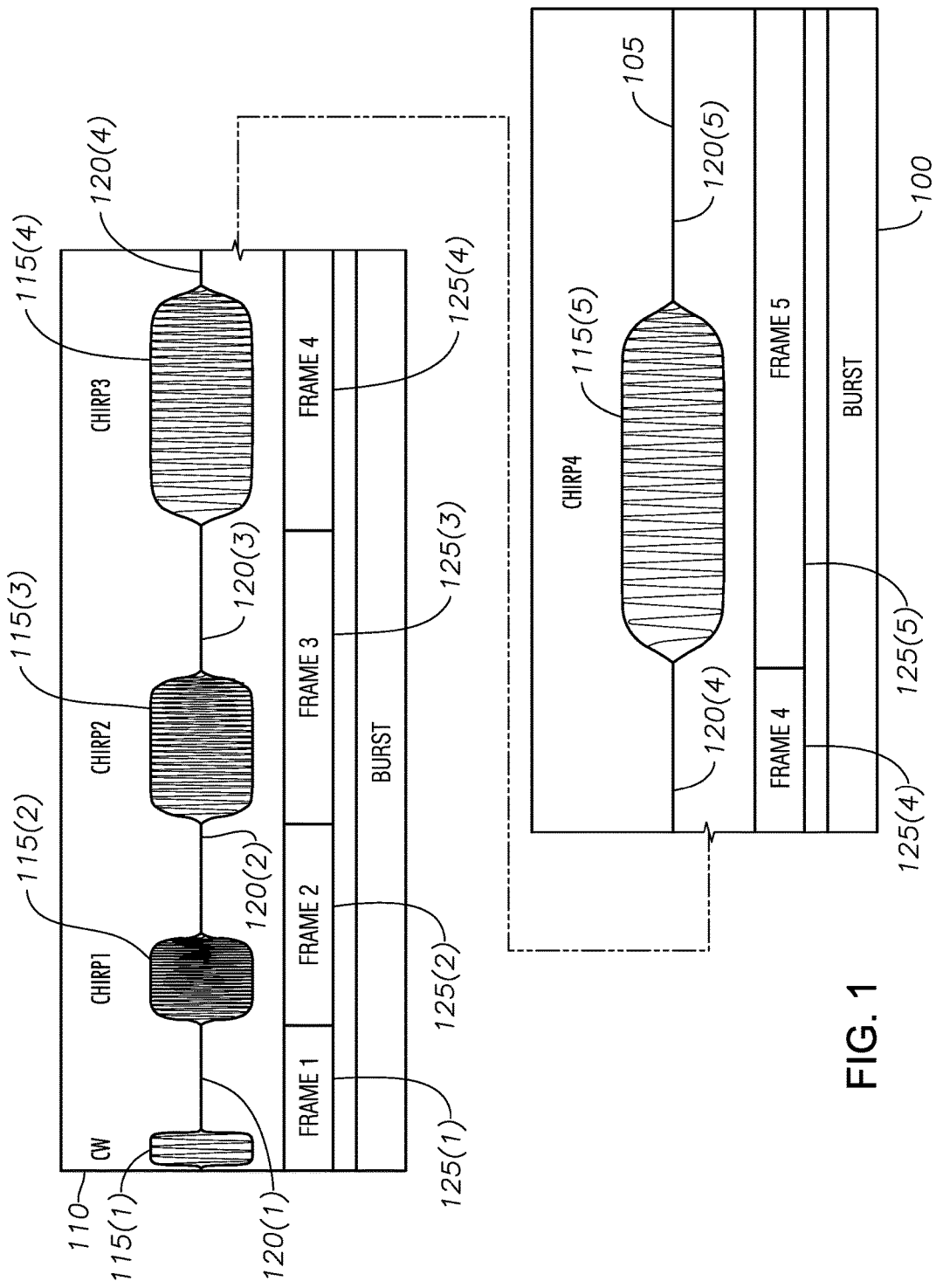
FIG. 1 is a graphical representation of a burst in accordance with techniques described herein.

In one implementation, the one or more radar signals may be in the form of one or more bursts. A burst may be a baseband radar signal that includes a succession of selectable pulse signals that cover a particular area. For purposes of this document, "radio transmits" or "radio transmitting" will hereinafter refer to transmitting a carrier frequency radar signal modulated by one or more bursts. FIG. 1 is a graphical representation of a burst 100 in accordance with techniques described herein. The horizontal axis 105 may represent time, whereas the vertical axis 110 may represent amplitude.

The burst 100 may be composed of one or more pulse signals 115(1) to 115(5), where each pulse signal may have a different length and/or bandwidth. In one implementation, the pulse signals 115(1) to 115(5) may increase in length with respect one another over time, such that the pulse signal 115(1) has the shortest length and the pulse signal 115(5) has the longest length. The variation in length and/or bandwidth may allow the multi-range pulse compression radar system to simultaneously satisfy certain desired target distances and energy on target levels. In particular, the shorter pulse signals may allow for the detection of shorter distance targets, whereas the longer pulse signals may allow for the detection of longer distance targets. Further, the pulse signals 115(1) to 115(5) may be composed of continuous wave signals and/or chirp signals. A chirp signal is a signal with a frequency that increases or decreases over a period of time, linearly, exponentially or in any one of a variety of other ways. As shown in FIG. 1, the pulse signal 115(1) is a continuous wave signal, while the pulse signals 115(2) to 115(5) are chirp signals of increasing length and frequency.

The burst 100 may also include a time delay between each pulse signal to allow for reception of the reflected pulse signal. As shown in FIG. 1, time delays 120(1) to 120(5) may be disposed between the pulse signals 115(1) to 115(5). In some implementations, multiple bursts 100 may be used in order to assist with Doppler processing. In particular, a Doppler shift may be measured on a burst-to-burst basis. In such implementations, a burst rate may be higher than 2 kilohertz (kHz) to obtain a substantially unambiguous velocity range for a marine environment.

As shown in FIG. 1, each pulse signal 115(1) to 115(5) may be paired with a respective time delay 120(1) to 120(5) to form transmission frames 125(1) to 125(5). A burst can include any combination of the transmission frames 125(1) to 125(5). In the burst 100, the transmission frame 125(1) with its relatively short pulse signal 115(1) may be used to detect shorter distance targets, progressing through to the transmission frame 125(5) with its relatively long pulse signal 115(5) being used to detect longer distance targets. In another implementation, one or more transmission frames 125 may be repeated within the burst 100 in order to track high velocity targets.

As noted above, the multi-range pulse compression radar system may be configured to transmit bursts for a plurality of ranges proximate to the system. A range is an area within a predetermined distance from the multi-range pulse compression radar system. For example, a short range can include an area within a relatively short distance from the multi-range pulse compression radar system. A medium range can include an area within a distance that is farther than the short distance from the multi-range pulse compression radar system. A long range can include an area having a distance that is relatively far from the multi-range pulse compression radar system.

The multiple ranges at which the multi-range pulse compression radar system operates may be selected in various ways. In one implementation, the multi-range pulse compression radar system can receive selections for the multiple ranges through a user input device, such as those discussed below with respect to FIG. 9. A user input device can include, but is not limited to, a keyboard, a touch or heat sensitive display screen, a mouse, a knob, a switch, a button, and/or the like. In other implementations, the multiple ranges can be predetermined or may be selected by another device.

For each of the multiple selected ranges, the multi-range pulse compression radar system may determine a unique burst needed to cover that range. In one implementation, for each unique burst for a selected range, only the minimum number of transmission frames 125 (with their associated pulse signals) needed to cover the selected range may be included in the unique burst. In particular, the longer the range that needs radar coverage by the system, the more transmission frames 125 that may be included in the unique burst for each range. Therefore, each one of the multiple ranges can be associated with a unique burst, where each unique burst may include a unique combination of the transmission frames 125.

For example, the multi-range pulse compression radar system may receive a selection indicating that radar coverage is to be provided for a range A and a range B. The multi-range pulse compression radar system may then determine that a burst A may be used to provide coverage for the range A, and that a burst B may be used to provide coverage for the range B. The burst A and the burst B may each have a different number and/or type of transmission frames, such that burst A and burst B are unique to one another.

For a further example, FIG. 2 illustrates a pictorial representation 200 of the burst A and the burst B in accordance with the techniques described herein. As shown, the burst A and the burst B may be similarly constructed like burst 100 as discussed above. In such an example, range A may be long range and range B may be short range. Accordingly, the multi-range pulse compression radar system may determine that the burst A should include a minimum of five transmission frames (i.e., transmission frames 125(1) to 125(5)) in order to provide coverage for the range A, and that the burst B should include a minimum of two transmission frames (i.e., transmission frames 125(1) to 125(2)) in order to provide coverage for the range B.

Common Bursts

As further explained below, the multi-range pulse compression radar system may provide radar coverage to the multiple selected ranges using a common burst. In particular, the multi-range pulse compression radar system may combine the one or more transmission frames from all of the unique bursts associated with the selected ranges into a common burst. By forming the common burst in such a way, the multi-range pulse compression radar system may use the common burst to provide radar coverage for multiple ranges.

In a further implementation, one or more of the unique bursts of the selected ranges may have transmission frames that are the same as the transmission frames of other unique bursts of the selected ranges. In such an implementation, the transmission frames that are common to more than one unique burst are included only once in the common burst.

For example, FIG. 3 illustrates a pictorial representation 300 of a common burst 330 that is radio transmitted by a multi-range pulse compression radar system in accordance with the techniques described herein. In particular, the common burst 330 may be formed using the transmission frames of burst A and burst B discussed above with respect to FIG. 2. Accordingly, the common burst 330 may be used to provide radar coverage for both the range A and the range B mentioned above with respect to FIG. 2.

As noted above, the multi-range pulse compression radar system may determine that the burst A may be used to provide coverage for the range A, where the burst A includes five transmission frames (e.g., transmission frames 125(1) to 125(5)). Similarly, the multi-range pulse compression radar system may determine that the burst B may be used to provide coverage for the range B, where the burst B includes two transmission frames (e.g., transmission frames 125(1) to 125(2)).

Thus, the common burst 330 may be formed using the transmission frames of burst A and burst B. In one implementation, where the burst A includes transmission frames 125(1) to 125(5) and the burst B includes transmission frames 125(1) to 125(2), both bursts A and B may have the frames 125(1) to 125(2) in common with one another. In such an implementation, the common burst 330 may include the frames 125(1) to 125(2) only once when combining the transmission frames of bursts A and B. Accordingly, the common burst 330 may combine the transmission frames of bursts A and B such that the common burst 330 is composed of the five transmission frames 125(1) to 125(5).

As shown in FIG. 3, a horizontal axis 305 of the pictorial representation 300 may represent azimuth angle values (described in greater detail below) at which an antenna (discussed below) of the multi-range pulse compression radar system transmits each common burst 330. The vertical axis 310 may represent a number of transmission frames (e.g., transmission frames 125) that are transmitted with each burst.

At azimuth angles 0, 0.2, 0.4, 0.6, 0.8, and 1 degrees, the multi-range pulse compression radar system may radio transmit the common burst 330 to cover the range A and the range B. In particular, the transmission frames 125(1) to 125(5) are used to provider radar coverage for range A, and the transmission frames 125(1) to 125(2) are used to provider radar coverage for range B.

The use of the common burst by the multi-range pulse compression radar system may assist an operator with maximizing a dwell count for a target proximate to the system. A dwell count is equal to the number of bursts transmitted for a stationary point target during the time that a rotating antenna beam illuminates the target. By using the common burst as described above, the multi-range pulse compression radar system may maximize the dwell count for the target, as the antenna is able to transmit an appropriate number of transmission frames for the target with every common burst. A higher dwell count may result in better radar coverage of the multiple ranges. As shown in FIG. 3, since ranges A and B are covered six times between azimuth angles 0-1 degrees, the dwell count for the system may be equal to six.

Figure 4:
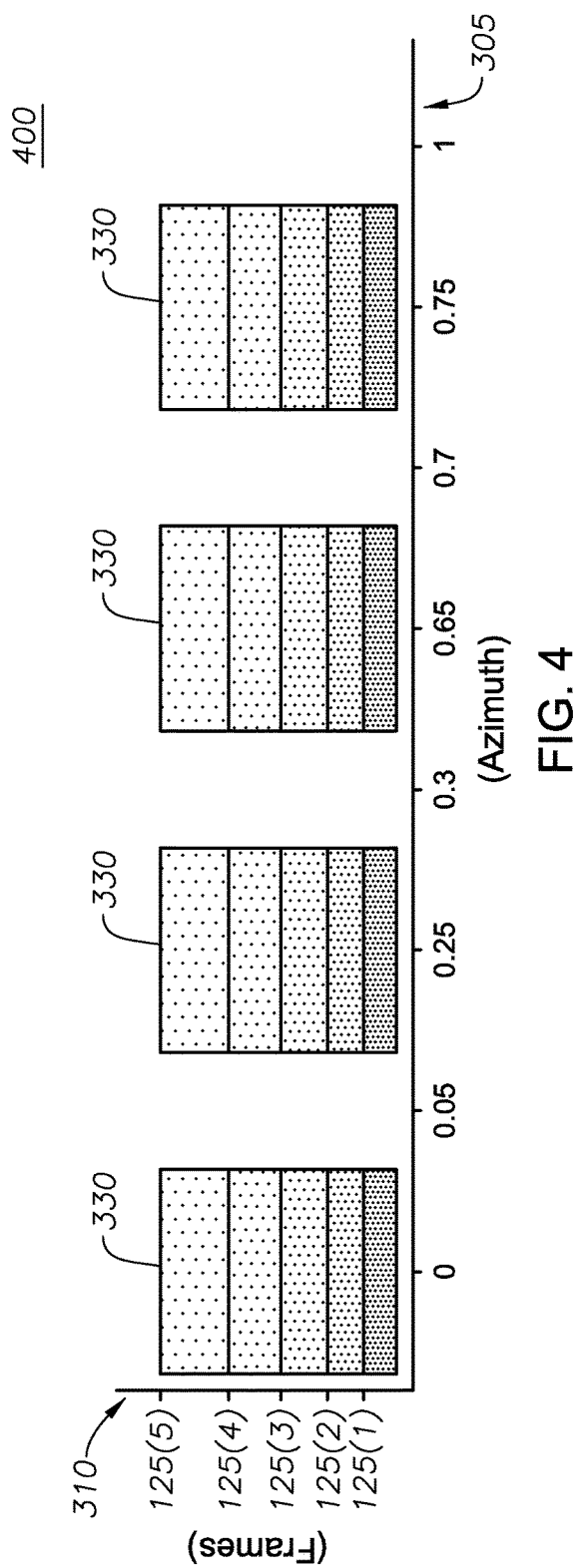
FIG. 4 illustrates a pictorial representation of a common burst that is radio transmitted by a multi-range pulse compression radar system in accordance with the techniques described herein.

In another implementation, the multi-range pulse compression radar system may not maximize the dwell count when using the common bursts. For example, FIG. 4 illustrates a pictorial representation 400 of the common burst 330 that is radio transmitted by a multi-range pulse compression radar system in accordance with the techniques described herein. The common burst 330, the horizontal axis 305, and the vertical axis 310 are the same as those discussed above with respect to FIG. 3.

At azimuth angles 0, 0.25, 0.65, and 0.75 degrees, the multi-range pulse compression radar system may radio transmit the common burst 330 to cover the range A and the range B. As noted above, the transmission frames 125(1) to 125(5) are used to provider radar coverage for range A, and the transmission frames 125(1) to 125(2) are used to provider radar coverage for range B.

However, at azimuth angles 0.05, 0.3, 0.7, and 1 degrees, the multi-range pulse compression radar system does not transmit the common burst 330. Since ranges A and B are covered four times between azimuth angles 0-1 degrees, the dwell count for the system may be equal to four. By transmitting the common burst 330 less often, the duty cycle of the multi-range pulse compression radar system may be reduced. The duty cycle may be defined as the percentage of the time that the antenna of the radar system transmits its bursts. With lower duty cycles, less power may be consumed by the radar system, and the radar system may also contribute less radio interference to other devices.

Figure 5:
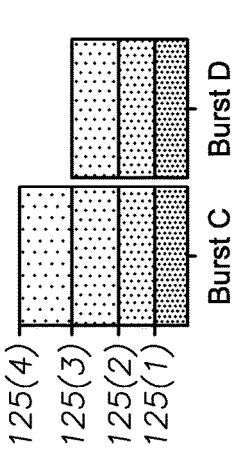
FIG. 5 illustrates a pictorial representation of bursts in accordance with the techniques described herein.

In another implementation, the multi-range pulse compression radar system may use the common burst to provide radar coverage for medium ranges. For example, FIG. 5 illustrates a pictorial representation 500 of a burst C and a burst D in accordance with the techniques described herein.

As shown, the burst C and the burst D may be similarly constructed like burst 100 as discussed above. Further, the multi-range pulse compression radar system may then determine that the burst C may be used to provide coverage for a range C, and that the burst D may be used to provide coverage for a range D. In such an example, range C and range D may both be medium ranges. Accordingly, the multi-range pulse compression radar system may determine that the burst C should include a minimum of four transmission frames (i.e., transmission frames 125(1) to 125(4)) in order to provide coverage for the range C, and that the burst D should include a minimum of three transmission frames (i.e., transmission frames 125(1) to 125(3)) in order to provide coverage for the range D.

In a further example, FIG. 6 illustrates a pictorial representation 600 of a common burst 630 that is radio transmitted by a multi-range pulse compression radar system in accordance with the techniques described herein. In particular, the common burst 630 may be formed using the transmission frames of burst C and burst D discussed above with respect to FIG. 5. Accordingly, the common burst 630 may be used to provide radar coverage for both the range C and the range D mentioned above with respect to FIG. 5.

The common burst 630 may be formed using the transmission frames of burst C and burst D. In one implementation, where the burst C includes transmission frames 125(1) to 125(4) and the burst D includes transmission frames 125(1) to 125(3), both bursts C and D may have the frames 125(1) to 125(3) in common with one another. In such an implementation, the common burst 630 may include the frames 125(1) to 125(3) only once when combining the transmission frames of bursts C and D. Accordingly, the common burst 630 may combine the transmission frames of bursts C and D such that the common burst 630 is composed of the four transmission frames 125(1) to 125(4).

As shown in FIG. 6, the horizontal axis 605 and the vertical axis 610 may be similar to those of FIGS. 3-4. At azimuth angles 0, 0.1, 0.2, 0.3, 0.4, 0.5, 0.6, 0.7, 0.8, 0.9 and 1 degrees, the multi-range pulse compression radar system may radio transmit the common burst 630 to cover the range C and the range D. In particular, the transmission frames 125(1) to 125(4) are used to provider radar coverage for range C, and the transmission frames 125(1) to 125(3) are used to provider radar coverage for range D. As shown, since ranges C and D are covered eleven times between azimuth angles 0-1 degrees, the dwell count for the system may be equal to eleven.

In a similar example, FIG. 7 illustrates a pictorial representation 700 of the common burst 630 that is radio transmitted by a multi-range pulse compression radar system in accordance with the techniques described herein. The common burst 630, the horizontal axis 605, and the vertical axis 610 are the same as those discussed above with respect to FIG. 6.

At azimuth angles 0, 0.2, 0.4, 0.6, 0.8, and 1 degrees, the multi-range pulse compression radar system may radio transmit the common burst 630 to cover the range C and the range D. As noted above, the transmission frames 125(1) to 125(4) are used to provider radar coverage for range C, and the transmission frames 125(1) to 125(3) are used to provider radar coverage for range D. However, at azimuth angles 0.1, 0.3, 0.5, 0.7, and 0.9 degrees, the multi-range pulse compression radar system does not transmit the common burst 630. The dwell count for the system may be equal to 5.5. By transmitting the common burst 630 less often, the duty cycle of the multi-range pulse compression radar system may be reduced.

In other implementations, and as mentioned above, the multi-range pulse compression radar system may use a common burst for more than two selected ranges. For example, the system may determine three or more unique bursts (e.g., burst A, burst B, and burst C) associated with three or more selected ranges. The common burst may then be formed using the transmission frames of the three or more unique bursts.

As mentioned above, the multi-range pulse compression radar system may determine the distance of one or more objects in the multiple ranges by transmitting the common bursts to an area proximate to the system and receiving the reflected common bursts, where the reflected bursts are used for further processing by the multi-range pulse compression radar system. The multi-range pulse compression radar system is discussed in greater detail below with respect to FIG. 7.

Radar System

Figure 8:
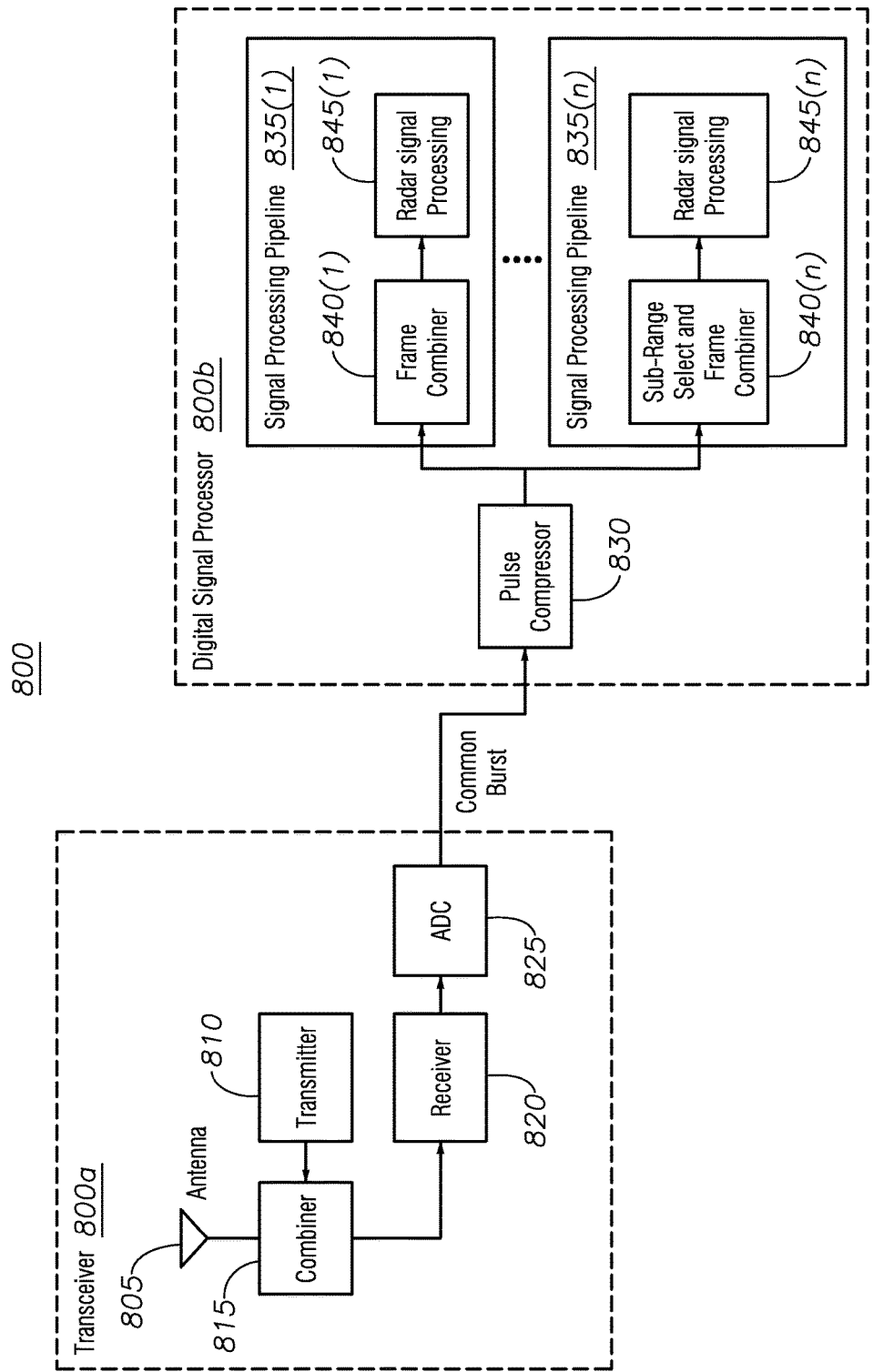
FIG. 8 illustrates a block diagram of a multi-range pulse compression radar system in accordance with techniques described herein.

FIG. 8 illustrates a block diagram of a multi-range pulse compression radar system 800 in accordance with techniques described herein. The multi-range pulse compression radar system 800 may include a transceiver section 800*a* and a digital signal processor 800*b*. The transceiver section 800*a* may transmit and receive signals (i.e., bursts) as described above. The digital signal processor 800*b* may determine the distance of one or more objects in an area proximate to the multi-range pulse compression radar system 800, such as by determining the time delay between transmitted signals and the received signals as described above.

In one implementation, the transceiver section 800*a* may include an antenna 805, a transmitter 810, a combiner 815, a receiver 820, and an analog to digital converter (ADC) 825. The antenna 805 may radio transmit the common bursts and may receive reflected signals. In certain implementations, the antenna 805 may include a directional antenna that transmits and receives radio signals in a particular direction, known as the azimuth angle. The azimuth angle is measured in degrees. By rotating the directional antenna, and transmitting and receiving radio signals at various intervals over 360 degrees, objects in the multiple ranges can be detected in all directions.

The transmitter 810 may prepare and/or construct the bursts for radio transmission. Since the burst and reflected signal may include time varying frequencies, the combiner 815 between the transmitter 810 and the antenna 805 may allow for transmission and reception of multiple frequencies. The receiver 820 may receive the reflected signal via the antenna 805, demodulate the reflected signal to recover a baseband signal (now referred to as the "received signal"), and provide the received signal to the ADC 825. The receiver may alternatively convert the reflected signal to an intermediate frequency that may be sampled or sub-sampled by the ADC 825 with the final conversion to baseband being performed by well-known digital methods. The ADC 825 may digitize the received signal at a constant sampling rate (now referred to as the "digital domain"). For purposes of this document, "received signal" shall refer to both the analog received signal and the digitized received signal.

The digital signal processor 800*b* may process the received signals. In one implementation, the digital signal processor 800*b* may include a single pulse compressor 830, and may include signal processing pipelines 835(1 . . . n) for each one of an n number of selected ranges.

The pulse compressor 830 may perform a pulse compression on the received signals, as is known to those skilled in the art. In one implementation, the pulse compressor 830 may be in the form of a correlator. In such an implementation, the pulse compressor 830 may use a process known as correlation to compare the received signal for a particular range to the common burst. The output of the pulse compressor 830 may be known as a compressed signal. The compressed signal may indicate the time lapses between the common burst and the received signal for the range. Since the common burst includes multiple transmission frames, the compressed signal may indicate the time lapses for each of the transmission frames of the common burst.

As noted above the signal processing pipelines 835 may include a signal processing pipeline 835(1 . . . n) for each of the multiple ranges using the common burst. In one implementation, each of the multiple ranges may use a unique combination of the transmission frames 225 of the common burst. Thus, for each particular range using a particular pipeline 835(2 . . . n), the pulse compressor 830 may provide the portion(s) of the compressed signal which indicate the time delay(s) for the particular transmission frames 225 used for that particular range. In another implementation, the signal processing pipeline 835(1) may be associated with the longest selected range, and may receive signals corresponding to the entire common burst, whereas the signal processing pipeline 835(n) may receive signals corresponding to some of the transmission frames of the common burst.

The signal processing pipelines 835(1 . . . n) may include frame combiners 840(1 . . . n) and additional radar signal processing circuitry 845(1 . . . n). As noted above, each signal processing pipeline 835(1 . . . n) may receive at least a portion of the compressed signal. The frame combiners 840(1 . . . n) may combine the portions of the compressed signal that are received by each signal processing pipeline 835(1 . . . n) from the pulse compressor 830. The frame combiners 840(1 . . . n) may each output signals to respective additional radar signal processing circuitry 845(1 . . . n). The additional radar signal processing circuitry 845(1 . . . n) may include one or more circuitry components known to those skilled in the art. For example, the additional radar signal processing circuitry 845(1 . . . n) may be used to determine the distance of one or more objects proximate to the system 800.

Figure 9:
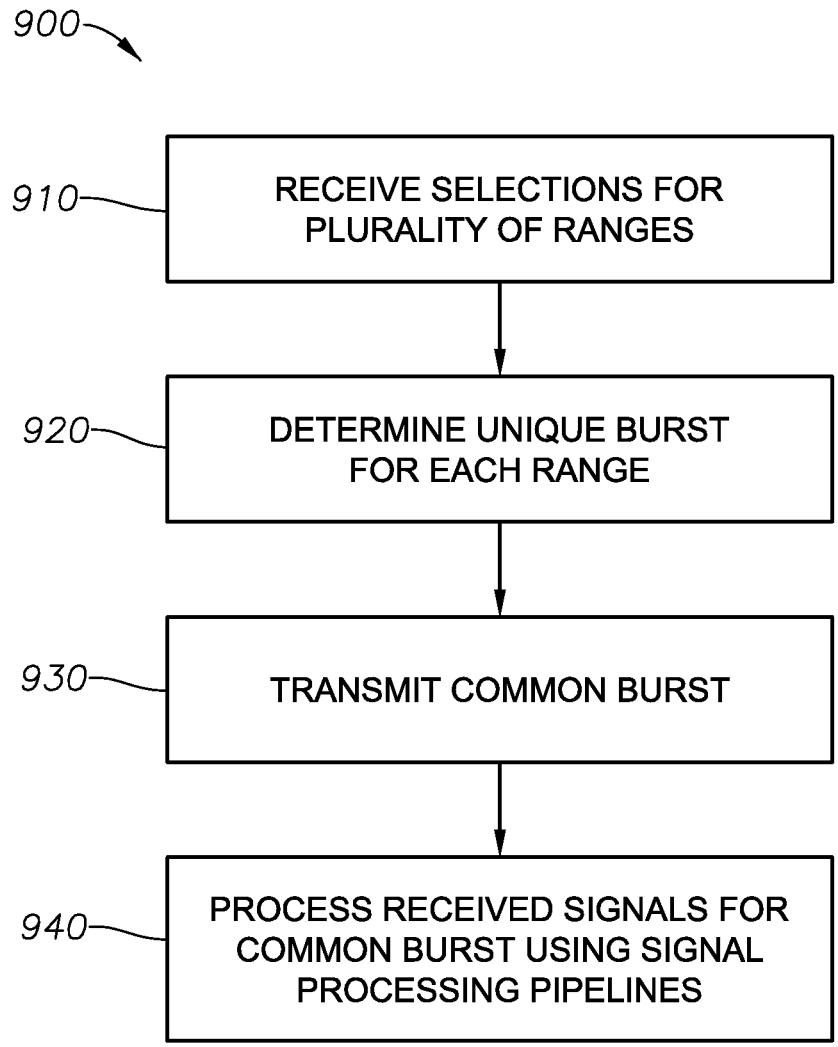
FIG. 9 illustrates a flow diagram of a method for covering multiple ranges in accordance with implementations of various techniques described herein.

FIG. 9 illustrates a flow diagram of a method 900 for covering multiple ranges in accordance with implementations of various techniques described herein. In one implementation, method 900 may be performed by one or more components, including a multi-range pulse compression radar system. It should be understood that while method 900 indicates a particular order of execution of operations, in some implementations, certain portions of the operations might be executed in a different order. Further, in some implementations, additional operations or steps may be added to the method 900. Likewise, some operations or steps may be omitted.

At block 910, the multi-range pulse compression radar system may receive selections for a plurality of ranges proximate to the system. As noted above, a range is an area within a predetermined distance from the multi-range pulse compression radar system. In one implementation, the system may receive selections for n number of ranges.

At block 920, the multi-range pulse compression radar system may determine a unique burst for each of the selected ranges. In one implementation, for each unique burst for a selected range, only the minimum number of transmission frames (with their associated pulse signals) needed to cover the selected range may be included in the unique burst.

At block 930, the multi-range pulse compression radar system may transmit a common burst to provide radar coverage for the selected ranges. As noted above, the multi-range pulse compression radar system may combine the transmission frames from all of the unique bursts associated with the selected ranges into a common burst. By forming the common burst in such a way, the multi-range pulse compression radar system may use the common burst to provide radar coverage for multiple ranges.

At block 940, the multi-range pulse compression radar system may process the received signals for the common burst using signal processing pipelines. In particular, a pulse compressor may perform a pulse compression on the received signals. The output of the pulse compressor may be processed using a plurality of signal processing pipelines, where each signal processing pipeline may be associated with one of the selected ranges.

In sum, implementations relating to a common burst for pulse compression radar, described above with respect to FIGS. 1-9, may be used to reduce a number of pulse compressions performed for a given dwell count, when compared to transmitting a different burst for each selected range. In addition, a number of transmission frames used per burst can be reduced when compared to transmitting a different burst for each selected range, which may, in turn, lead to a lower duty cycle and reduced radio interference. Further, when compared to transmitting a different burst for each selected range, an increase in integration gain may be possible due to an increase in the dwell count.

Computing System

Figure 10:
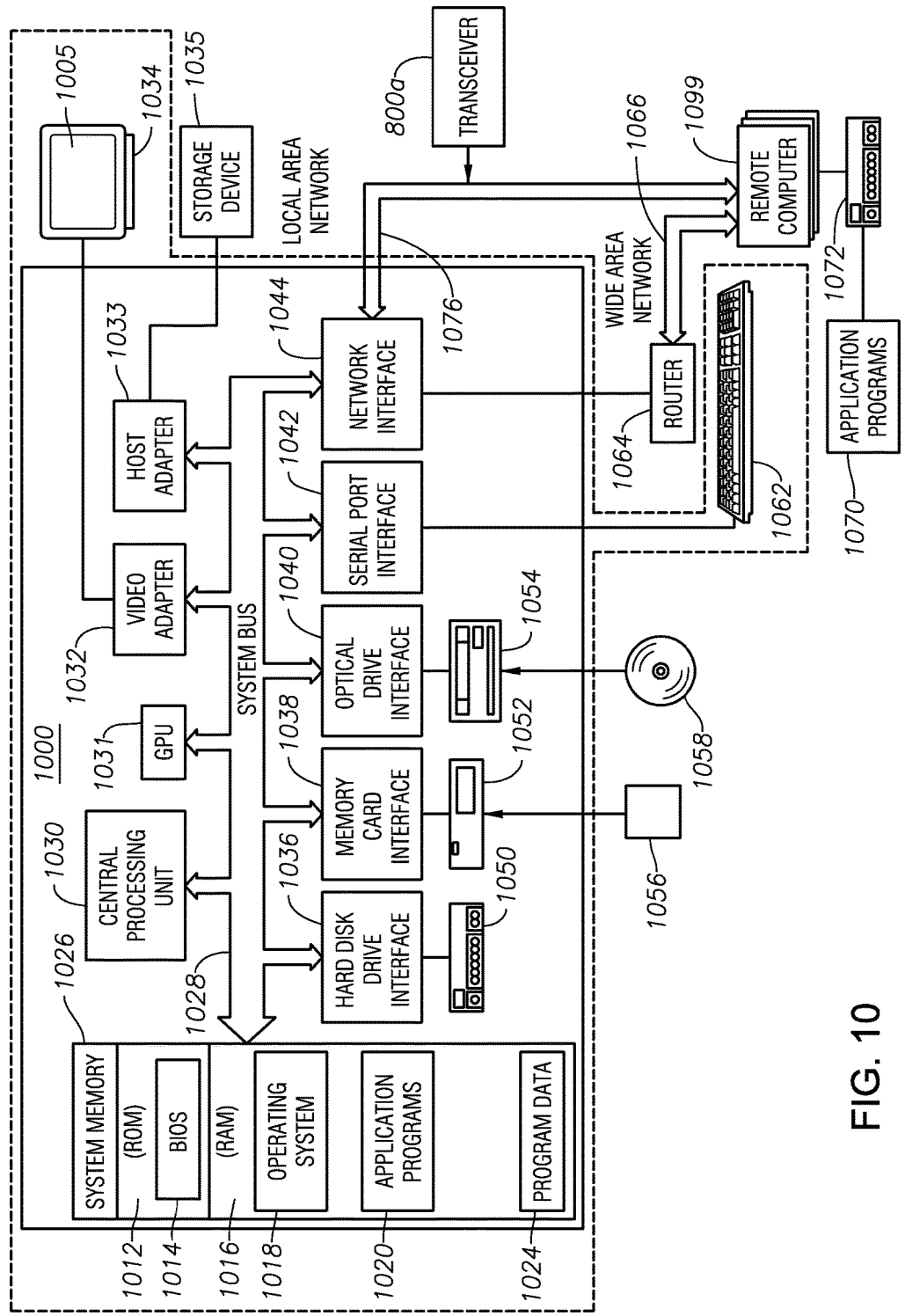
FIG. 10 illustrates a computing system in accordance with implementations of various techniques described herein.

FIG. 10 illustrates a computing system 1000 in accordance with implementations of various techniques described herein. The computing system 1000 may include a central processing unit (CPU) 1030, a system memory 1026, a graphics processing unit (GPU) 1031 and a system bus 1028 that couples various system components including the system memory 1026 to the CPU 1030. Although only one CPU 1030 is illustrated in FIG. 10, it should be understood that in some implementations the computing system 1000 may include more than one CPU 1030.

The CPU 1030 may include a microprocessor, a microcontroller, a processor, a programmable integrated circuit, or a combination thereof. The CPU 1030 can comprise an off-the-shelf processor such as a Reduced Instruction Set Computer (RISC), or a Microprocessor without Interlocked Pipeline Stages (MIPS) processor, or a combination thereof. The CPU 1030 may also include a proprietary processor.

The GPU 1031 may be a microprocessor specifically designed to manipulate and implement computer graphics. The CPU 1030 may offload work to the GPU 1031. The GPU 1031 may have its own graphics memory, and/or may have access to a portion of the system memory 1026. As with the CPU 1030, the GPU 1031 may include one or more processing units, and each processing unit may include one or more cores.

The CPU 1030 may provide output data to a GPU 1031. The GPU 1031 may generate graphical user interfaces that present the output data. The GPU 1031 may also provide objects, such as menus, in the graphical user interface. A user may provide inputs by interacting with the objects. The GPU 1031 may receive the inputs from interaction with the objects and provide the inputs to the CPU 1030. A video adapter 1032 may be provided to convert graphical data into signals for a monitor 1034. The monitor 1034 includes a screen 1005. In certain implementations, the screen 1005 may be sensitive to touching by a finger. In other implementations, the screen 1005 may be sensitive to the body heat from the finger, a stylus, or responsive to a mouse.

Additionally, in certain implementations, the screen may have the capability of displaying more than one plan position indicator (PPI).

The system bus 1028 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 1026 may include a read only memory (ROM) 1012 and a random access memory (RAM) 1016. A basic input/output system (BIOS) 1014, containing the basic routines that help transfer information between elements within the computing system 1000, such as during start-up, may be stored in the ROM 1012.

The computing system 1000 may further include a hard disk drive interface 1036 for reading from and writing to a hard disk 1050, a memory card reader 1052 for reading from and writing to a removable memory card 1056, and an optical disk drive 1054 for reading from and writing to a removable optical disk 1058, such as a CD ROM or other optical media. The hard disk 1050, the memory card reader 1052, and the optical disk drive 1054 may be connected to the system bus 1028 by a hard disk drive interface 1036, a memory card reader interface 1038, and an optical drive interface 1040, respectively. The drives and their associated computer-readable media may provide nonvolatile storage of computer-readable instructions, data structures, program modules and other data for the computing system 1000.

Although the computing system 1000 is described herein as having a hard disk, a removable memory card 1056 and a removable optical disk 1058, it should be appreciated by those skilled in the art that the computing system 1000 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1000. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 1000 may also include a host adapter 1033 that connects to a storage device 1035 via a small computer system interface (SCSI) bus, a Fiber Channel bus, an eSATA bus, or using any other applicable computer bus interface.

The computing system 1000 can also be connected to a router 1064 to establish a wide area network (WAN) 1066 with one or more remote computers 1084. The router 1064 may be connected to the system bus 1028 via a network interface 1044. The remote computers 1084 can also include hard disks 1082 that store application programs 1080.

In another implementation, the computing system 1000 may also connect to the remote computers 1084 via local area network (LAN) 1086 or the WAN 1066. When using a LAN networking environment, the computing system 1000 may be connected to the LAN 1086 through the network interface or adapter 1044. The LAN 1086 may be implemented via a wired connection or a wireless connection. The LAN 1086 may be implemented using Wi-Fi™ technology, cellular technology, Bluetooth™ technology, satellite technology, or any other implementation known to those skilled in the art. The network interface 1044 may also utilize remote access technologies (e.g., Remote Access Service (RAS), Virtual Private Networking (VPN), Secure Socket Layer (SSL), Layer 6 Tunneling (L2T), or any other suitable protocol). These remote access technologies may be implemented in connection with the remote computers 1084. It will be appreciated that the network connections shown are exemplary and other means of establishing a communications link between the computer systems may be used.

A number of program modules may be stored on the hard disk 1050, memory card 1056, optical disk 1058, ROM 1012 or RAM 1016, including an operating system 1018, one or more application programs 1020, and program data 1024. In certain implementations, the hard disk 1050 may store a database system. The database system could include, for example, recorded points. The application programs 1020 may include various mobile applications ("apps") and other applications configured to perform various methods and techniques described herein. The operating system 1018 may be any suitable operating system that may control the operation of a networked personal or server computer.

A user may enter commands and information into the computing system 1000 through input devices such as buttons 1062, which may be physical buttons, virtual buttons, or combinations thereof. Other input devices may include a microphone, a mouse, or the like (not shown). These and other input devices may be connected to the CPU 1030 through a serial port interface 1042 coupled to system bus 1028, but may be connected by other interfaces, such as a parallel port, game port or a universal serial bus (USB).

Certain implementations may be configured to be connected to the transceiver section 800a of a multi-range pulse compression radar system 800. In one implementation, the one or more application programs 1020 or 1080 stored in the computer-readable media can include a plurality of instructions that when executed by a processing unit, such as a CPU 1030, cause the computing system to perform any of the techniques, or portions thereof, that are described herein.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, the method comprising:
    determining a first burst for a first range using a pulse compression radar system, wherein the first burst comprises one or more first transmission frames;
    determining a second burst for a second range using the pulse compression radar system, wherein the second burst comprises one or more second transmission frames, wherein the first range is different than the second range; and
    transmitting a common burst for the first range and the second range using the pulse compression radar system, wherein the common burst includes the one or more first transmission frames and the one or more second transmission frames, wherein at least one common transmission frame is included in the one or more first transmission frames and included in the one or more second transmission frames, wherein the at least one common transmission frame is transmitted once with the common burst.

2. The method of claim 1, wherein the one or more second transmission frames include at least one transmission frame that is not included in the one or more first transmission frames.

3. The method of claim 1, further comprising:
    determining a third burst for a third range using the pulse compression radar system, wherein the third burst comprises one or more third transmission frames; and
    transmitting a common burst for the first range, the second range, and the third range using the pulse compression radar system, wherein the common burst includes the one or more first transmission frames, the one or more second transmission frames, and the one or more third transmission frames.

4. The method of claim 1, wherein the first range and the second range respectively represent an area proximate to the pulse compression radar system.

5. The method of claim 1, wherein the first range is longer than the second range, and wherein the first burst is composed of a greater number of transmission frames than the second burst.

6. The method of claim 1, wherein the one or more first transmission frames and the one or more second transmission frames respectively include one or more chirp signals.

7. The method of claim 1, wherein transmitting the common burst maximizes a dwell count for the pulse compression radar system.

8. The method of claim 1, further comprising:
    performing a pulse compression on one or more received signals corresponding to the common burst;
    processing an output of the pulse compression that corresponds to the first range using a first processing pipeline of the pulse compression radar system; and
    processing an output of the pulse compression that corresponds to the second range using a second processing pipeline of the pulse compression radar system.

9. The method of claim 8, wherein performing the pulse compression comprises performing a correlation on the one or more received signals corresponding to the common burst.

10. The method of claim 8, wherein the first processing pipeline comprises a first frame combiner, and wherein the second processing pipeline comprises a second frame combiner.

11. A pulse compression radar system, the system comprising:
a digital signal processor configured to:
determine a first burst for a first range, wherein the first burst comprises one or more first transmission frames;
determine a second burst for a second range, wherein the second burst comprises one or more second transmission frames, wherein the first range is different than the second range; and
an antenna configured to:
transmit a common burst for the first range and the second range, wherein the common burst includes the one or more first transmission frames and the one or more second transmission frames, wherein at least one common transmission frame is included in the one or more first transmission frames and included in the one or more second transmission frames, wherein the at least one common transmission frame is transmitted once with the common burst.

12. The pulse compression radar system of claim 11, wherein the first range and the second range respectively represent an area proximate to the pulse compression radar system.

13. The pulse compression radar system of claim 11, wherein the first range is longer than the second range, and wherein the first burst is composed of a greater number of transmission frames than the second burst.

14. The pulse compression radar system of claim 11, wherein the one or more first transmission frames and the one or more second transmission frames respectively include one or more chirp signals.

15. The pulse compression radar system of claim 11, wherein the digital signal processor comprises:
a pulse compressor configured to perform pulse compression on one or more received signals corresponding to the common burst;
a first processing pipeline configured to process an output of the pulse compressor that corresponds to the first range; and
a second processing pipeline configured to process an output of the pulse compressor that corresponds to the second range.

16. The pulse compression radar system of claim 15, wherein the first processing pipeline comprises a first frame combiner, and wherein the second processing pipeline comprises a second frame combiner.

17. A method comprising:
determining a first burst for a first range using a pulse compression radar system, wherein the first burst comprises one or more first transmission frames;
determining a second burst for a second range using the pulse compression radar system, wherein the second burst comprises one or more second transmission frames, wherein the first range is different than the second range;
determining a third burst for a third range using the pulse compression radar system, wherein the third burst comprises one or more third transmission frames, wherein the third range is different than both the first range and the second range; and
transmitting a common burst for the first range, the second range, and the third range using the pulse compression radar system, wherein:
the common burst includes the one or more first transmission frames, the one or more second transmission frames, and the one or more third transmission frames;
at least one first common transmission frame is included in the one or more first transmission frames, the one or more second transmission frames, and the one or more third transmission frames;
at least one first semi-common transmission frame is included in the one or more second transmission frames and the one or more third transmission frames;
the at least one first common transmission frame and the at least one semi-common transmission frame are each transmitted once with the common burst.

18. The method of claim 17, further comprising:
performing a pulse compression on one or more received signals corresponding to the common burst;
processing an output of the pulse compression that corresponds to the first range using a first processing pipeline of the pulse compression radar system;
processing an output of the pulse compression that corresponds to the second range using a second processing pipeline of the pulse compression radar system; and
processing an output of the pulse compression that corresponds to the third range using a third processing pipeline of the pulse compression radar system.

19. The method of claim 17, wherein performing the pulse compression comprises performing a correlation on the one or more received signals corresponding to the common burst.

20. The method of claim 1, wherein each of the one or more first transmission frames define a frame range that does not overlap with any other of the one or more first transmission frames, and wherein each of the one or more second transmission frames define a frame range that does not overlap with any other of the one or more second transmission frames.

* * * * *